(12) United States Patent
Chin et al.

(10) Patent No.: US 8,885,981 B2
(45) Date of Patent: Nov. 11, 2014

(54) IMAGE RETRIEVAL USING TEXTURE DATA

(75) Inventors: Peter Koon Chin, North Sydney (AU); Trevor Gerald Campbell, North Sydney (AU); Ting Shan, North Sydney (AU)

(73) Assignee: Imprezzeo Pty Limited, St. Lucia (AU)

( * ) Notice: Subject to any disclaimer, the term of this patent is extended or adjusted under 35 U.S.C. 154(b) by 928 days.

(21) Appl. No.: 13/028,653

(22) Filed: Feb. 16, 2011

(65) Prior Publication Data

US 2011/0200260 A1 Aug. 18, 2011

(30) Foreign Application Priority Data

Feb. 16, 2010 (AU) ................................ 2010900621

(51) Int. Cl.
*G06K 9/54* (2006.01)
*G06F 17/30* (2006.01)
*G06K 9/00* (2006.01)

(52) U.S. Cl.
CPC .... *G06F 17/30262* (2013.01); *G06F 17/30244* (2013.01); *G06F 17/30277* (2013.01); *G06K 9/00536* (2013.01); *G06F 17/30247* (2013.01); *G06F 17/30256* (2013.01)
USPC .......................................................... 382/305

(58) Field of Classification Search
CPC ................... G06F 17/30262; G06F 17/30277; G06F 17/30256; G06F 17/30247; G06F 17/30244; G06K 9/00536

USPC .......................................................... 382/305
See application file for complete search history.

(56) References Cited

U.S. PATENT DOCUMENTS

2007/0201754 A1* 8/2007 Li ................................. 382/240

OTHER PUBLICATIONS

S. Mallat, A Theory for Multiresolution Signal Decomposition: The Wavelet Representation, IEEE 1989.*

* cited by examiner

*Primary Examiner* — Chan Park
*Assistant Examiner* — Mark Roz
(74) *Attorney, Agent, or Firm* — IPLM Group, P.A.

(57) ABSTRACT

A method, processing system and computer program product for image retrieval. In one aspect, the method includes, in a processing system: determining a query feature set for a search image, wherein the query feature set includes texture data indicative of a texture of the search image for a plurality of resolutions of the search image; determining a dissimilarity measurement between at least one query feature of the query feature set and at least one target feature of a target image set for one or more target images, wherein the dissimilarity measurement is determined at least partially based upon the dissimilarity between the texture data of the search image and one or more target images for at least some of the plurality of resolutions of the target image; and identifying one or more target images based upon the dissimilarity measurement.

15 Claims, 6 Drawing Sheets

$Texture[]_{10} = [2,2,1,1,1]$ $Texture[]_{11} = [2,2,2,1,1]$ $Texture[]_{12} = [2,2,2,2,1]$

$Texture[]_{13} = [2,2,1.25,1.25,1]$

IMAGE RETRIEVAL USING TEXTURE DATA

CROSS-REFERENCE TO RELATED APPLICATIONS

This application claims the benefit of priority from Australian Provisional Application No. 2010900621, filed on Feb. 16, 2010, which is hereby incorporated by reference in its entirety.

TECHNICAL FIELD

The present invention generally relates to identification, searching and/or retrieval of digital images. The present invention more particularly relates to a method, processing system and/or a computer program product for performing Content Based Image Retrieval (CBIR) techniques that use texture data.

BACKGROUND

Retrieval of images from a relatively large collection of reference images remains a significant problem. It is generally considered impractical for a user to simply browse a relatively large collection of images, for example thumbnail images, so as to select a desired image. Traditionally, images have been indexed by keyword(s) allowing a user to search the images based on associated keywords, with the results being presented using some form of keyword based relevancy test. Such an approach is fraught with difficulties since keyword selection and allocation generally requires human tagging, which is a time intensive process, and many images can be described by multiple or different keywords.

Figure 1A:
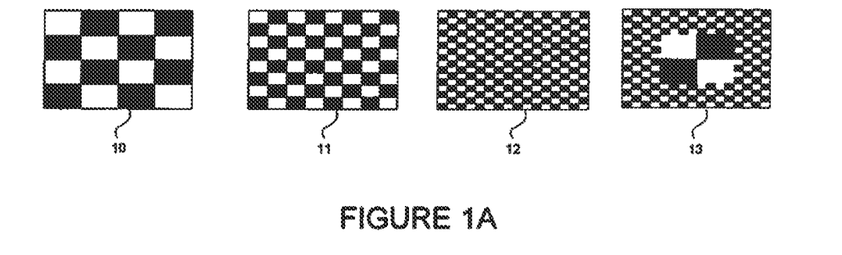
FIG. 1A illustrates sample images which are considered to be similar by a processing system using known techniques.

Alternative approaches have been proposed utilising a processing system to perform Content Based Image Retrieval. However, such an automated task can be quite difficult for a processing system to perform accurately. For example, if we consider four bi-level images shown in FIG. 1, and consider techniques such as the comparison of colour histograms or the comparison of edge features, we find that such techniques for each image return very similar measures, thus leading to a false positive conclusion indicating that the images include substantially similar content when clearly they do not.

Therefore, there is a need to provide a method, processing system, and/or a computer program product which overcomes or at least ameliorates the above mentioned disadvantages.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

In a first broad aspect there is provided a method of image retrieval, wherein the method includes, in a processing system:
   determining a query feature set for a search image, wherein the query feature set includes texture data indicative of a texture of the search image for a plurality of resolutions of the search image;
   determining a dissimilarity measurement between at least one query feature of the query feature set and at least one target feature of a target image set for one or more target images, wherein the dissimilarity measurement is determined at least partially based upon the dissimilarity between the texture data of the search image and one or more target images for at least some of the plurality of resolutions of the target image; and
   identifying one or more target images based upon the dissimilarity measurement.

In one form, the texture data for the search image and the target image includes a texture vector including a plurality of values.

In another form, texture vector of the search image is generated by performing steps including:
   a) converting the search image to a monochromatic image; and
   b) determining and storing in the texture vector a number of monochromatic levels of the monochromatic image;
   c) segmenting the monochromatic image to generate a plurality of segments;
   d) determining an average number of monochromatic levels for the plurality of segments of the respective segmentation;
   e) storing the average number of monochromatic levels for the respective segmentation in the texture vector; and
   f) if a segmentation condition has not been satisfied, segmenting each segment and repeating steps d) to f).

In one embodiment, the segmentation condition includes determining if a threshold number of segmentations have been performed.

In another embodiment, determining the average number of monochromatic levels for each segmentation includes:
   determining a number of monochromatic levels for each segment of the respective segmentation;
   summing the number of monochromatic levels for the segments of the respective segmentation to generate a total number of monochromatic levels; and
   dividing the total number of monochromatic levels by the number of segments to obtain the average number of monochromatic levels for the respective segmentation.

In an optional form, the step of converting the respective image to the monochromatic image includes convening the respective image to a greyscale image.

In another optional form, the method includes querying a data store in data communication with the processing system, wherein the data store includes texture data for the one or more target images.

In another broad aspect there is provided a processing system for image retrieval configured to:
   determine a query feature set for a search image, wherein the query feature set includes texture data indicative of a texture of the search image for a plurality of resolutions of the search image;
   determine a dissimilarity measurement between at least one query feature of the query feature set and at least one target feature of a target image set for one or more target images, wherein the dissimilarity measurement is determined at least partially based upon the dissimilarity between the texture data of the search image and one or more target images for at least some of the plurality of resolutions of the target image; and
   identify one or more target images based upon the dissimilarity measurement.

In one form, the texture data for the scare age and the target image includes a texture vector including a plurality of values.

In another form, the texture vector of the search image is generated by the processing system being configured to:

a) convert the search image to a monochromatic image; and
b) determine and store in the texture vector a number of monochromatic levels of the monochromatic image;
c) segment the monochromatic image to generate a plurality of segments;
d) determine an average number of monochromatic levels for the plurality of segments of the respective segmentation;
e) store the average number of monochromatic levels for the respective segmentation in the texture vector; and
f) if a segmentation condition has not been satisfied, segment each segment and repeat steps d) to f).

In one embodiment, the processing system s configured to determine if a segmentation condition has been satisfied by determining if a threshold number of segmentations have been performed.

In another embodiment, the processing system is configured to determine the average number of monochromatic levels for each segmentation by:

determining a number of monochromatic levels for each segment of the respective segmentation;

summing the number of monochromatic levels for the segments of the respective segmentation to generate a total number of monochromatic levels; and dividing the total number of monochromatic levels by the number of segments to obtain the average number of monochromatic levels for the respective segmentation.

In an optional form, the processing system is configured to convert the respective image to a greyscale image.

In another optional form, the processing system is configured to query a data store in data communication with the processing system, wherein the data store stores texture data for the one or more target images.

In another broad aspect there is provided a computer program product including a computer readable medium having data indicative of a computer program which configures a processing system to:

determine a query feature set for a search image, wherein the query feature set includes texture data indicative of a texture of the search image for a plurality of resolutions of the search image;

determine a dissimilarity measurement between at least one query feature of the query feature set and at least one target feature of a target image set for one or more target images, wherein the dissimilarity measurement is determined at least partially based upon the dissimilarity between the texture data of the search image and one or more target images for at least some of the plurality of resolutions of the target image; and identify one or more target images based upon the dissimilarity measurement.

In one form, the texture data for the search image and the target image includes a texture vector including a plurality of values.

In another form, wherein the texture vector of the search image is generated by the processing system being by the configured, by the computer program, to:

a) convert the search image to a monochromatic image; and
b) determine and store in the texture vector a number of monochromatic levels of the monochromatic image;
c) segment the monochromatic image to generate a plurality of segments;
d) determine an average number of monochromatic levels for the plurality of segments of the respective segmentation;
e) store the average number of monochromatic levels for the respective segmentation in the texture vector; and
f) if a segmentation condition has not been satisfied, segment each segment and repeat steps d) to f).

In one embodiment, the segmentation condition includes determining if a threshold number of segmentations have been performed.

In another embodiment, the computer readable medium configures the processing system to determine the average number of monochromatic levels for each segmentation by:

determining a number of monochromatic levels for each segment of the respective segmentation;

summing the number of monochromatic levels for the segments of the respective segmentation to generate a total number of monochromatic levels; and dividing the total number of monochromatic levels by the number of segments to obtain the average number of monochromatic levels for the respective segmentation.

In an optional form, the computer readable medium configures the processing system to convert the respective image to a greyscale image.

In another optional form, the computer readable medium configures the processing system to query a data store in data communication with the processing system, wherein the data store stores texture data for the one or more target images.

Other embodiments of the above mentioned broad aspects will be realised throughout the description of the example embodiments.

BRIEF DESCRIPTION OF THE FIGURES

Example embodiments should become apparent from the following description, which is given by way of example only, of at least one preferred but non-limiting embodiment, described in connection with the accompanying figures.

DESCRIPTION OF EMBODIMENTS

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Figure 1B:
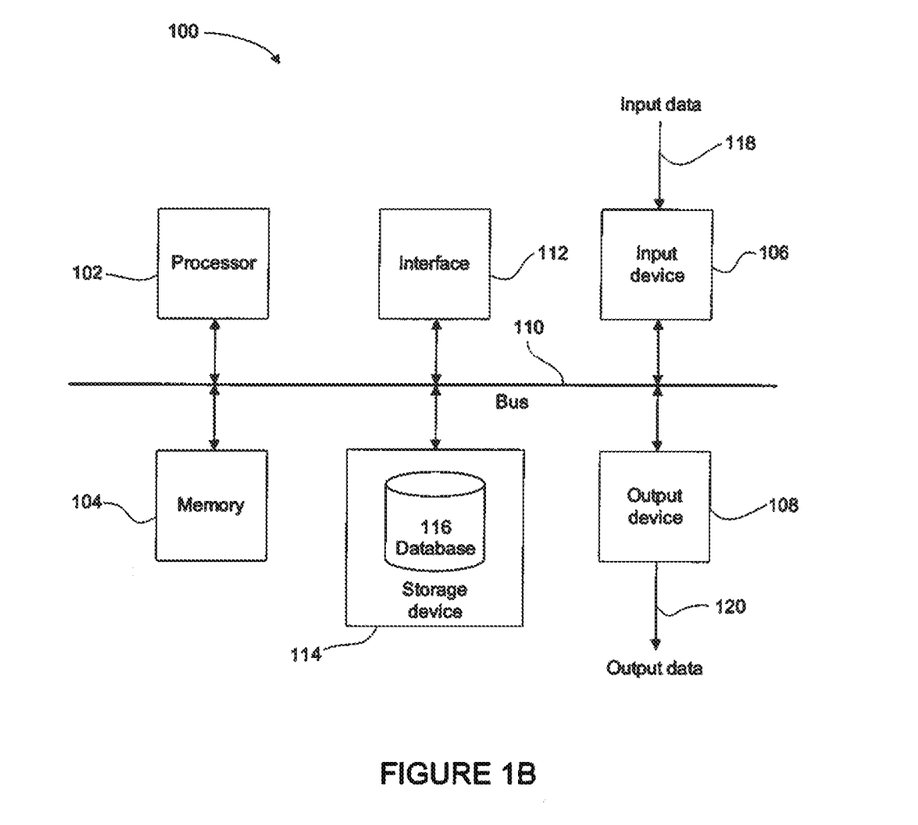
FIG. 1B illustrates a functional block diagram of an example processing system that can be utilised to embody or give effect to a particular embodiment.

A particular embodiment can be realized using a processing system, an example of which is shown in FIG. 1B. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

In one form there is provided a method of identifying and/or extracting one or more images from a 'target image set', being one or more target images (i.e. reference images). The method includes constructing a 'query feature set' by identifying, determining, calculating or extracting a 'set of features' from 'one or more selected images' which define a 'query image set'. The query image set includes texture data indicative of a texture of the one or more target images at a plurality of resolutions.

A 'distance' or 'dissimilarity measurement' is then determined, calculated or constructed between a 'query feature' from the query feature set and a 'target feature' from the target image set. The target feature set includes texture data indicative of a texture of one or more target images for a plurality of resolutions. The texture data of the query set and the target set can then be at least partially used to determine the dissimilarity measurement.

For example, the dissimilarity measurement may be obtained as a function of the weighted summation of differences or distances between the query features and the target features over all, or a portion, of the target image set. If there are suitable image matches, one or more identified images are identified, obtained and/or extracted from the target image set and can be displayed to a user. Identified images may be selected based on the dissimilarity measurement over all query features, for example by selecting images having a minimum dissimilarity measurement.

The weighted summation uses weights in the query feature set. The order of display of identified images can be ranked, for example based on the dissimilarity measurement. The identified images can be displayed in order from least dissimilar by increasing dissimilarity, although other ranking schemes such as size, age, filename, etc. are also possible. The query feature set may be extracted from a query image set having two or more selected images (selected by the user). The query feature set can be identified, determined and/or extracted using a feature tool such as a software program or computer application.

In one form, the query feature set can be extracted using low level structural descriptions of the query image set (i.e. one or more selected images by a user). For example, the query features or the query feature set could be extracted/selected from one or more of feature dimensions; colour; hue; luminance; structure; etc.

The query feature set can be viewed, in one form, as an 'idealized image' constructed as a weighted sum of the features (represented as 'feature vectors' of a query image). For example, the idealized image could be represented as $$I = \sum_i w_i x_i$$

where $x_i$ is a feature and $w_i$ is a weight applied to the feature. The weighted summation uses weights derived from the query image set. A program or software application can be used to construct the query feature set by extracting a set of features from the one or more selected images (i.e. the query image set) and construct the dissimilarity measurement.

An example method seeks to identify and retrieve images based on the feature content of the one or more selected images (i.e. the query image set) provided as examples by a user. The query feature set, which the search is based upon, is derived from the one or more example images (i.e. the query image set) supplied or selected by the user. The method extracts a perceptual importance of visual features of images and, in one example, uses a computationally efficient weighted linear dissimilarity measurement or metric that delivers fast and accurate image retrieval results.

A query image set Q is a set of example images I typically supplied by a user, so that $Q=\{I_{q1}, I_{q2}, \ldots, I_{qQ}\}$. The set of example selected images may be any number of images, including a single image. A user can provide one, two, three, four, etc. selected images. The user supplied images may be selected directly from a file, document, database and/or may be identified and selected through another image search tool, such as the keyword based Google® Images search tool.

In the following description the target or reference images, sometimes called the image database, is defined as target image set $T=\{I_m: m=1, 2, \ldots, M\}$. The query criteria is expressed as a similarity measure $S(Q, I_j)$ between the query Q and a target image $I_j$ in the target image set. A query process Q(Q, S, T) is a mapping of the query image set Q to a permutation $T_p$ of the target image set T, according to the similarity function $S(Q, I_j)$, where $T_p=\{I_m \epsilon T: m=1, 2, \ldots, M\}$ is a partially ordered set such that $S(Q, I_m) > S(Q, I_{m+1})$. In principle, the permutations are that of the whole image database, in practice only the top ranked output images need be evaluated.

Figure 2:
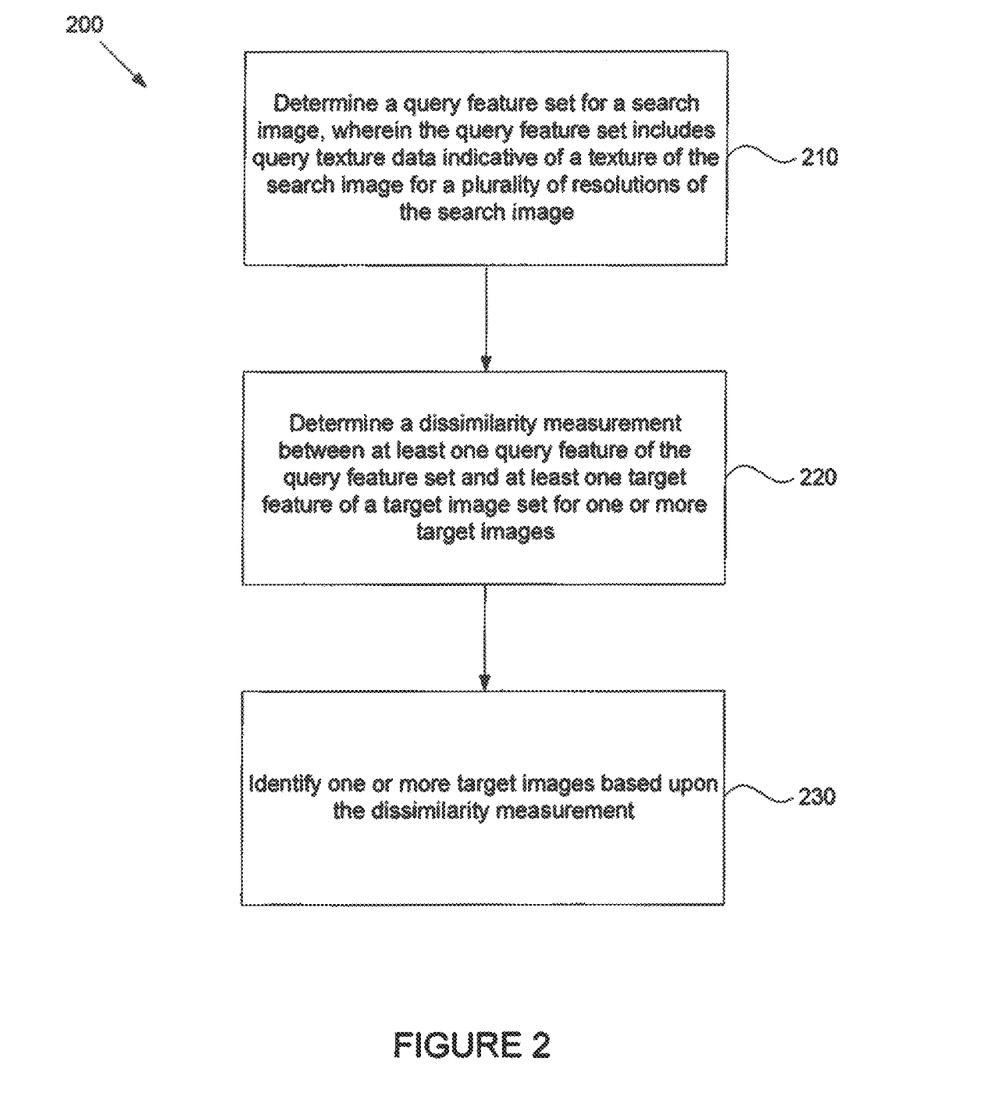
FIG. 2 illustrates a flow chart representing an example method of determining if a search image includes substantially similar content to a target image.

Referring to FIG. 2 there is shown a flow chart representing an example method of image retrieval.

In particular, at step 210, the method 200 includes determining a query feature set for a search image, wherein the query feature set includes query texture data indicative of a texture of the search image for a plurality of resolutions of the search image.

At step 220, the method 200 includes determining a dissimilarity measurement between at least one query feature of the query feature set and at least one target feature of a target image set for one or more target images, wherein the dissimilarity measurement is determined at least partially based upon the dissimilarity between the query texture data and target texture data indicative of a texture of the one or more target images for a plurality of resolutions for each target image.

At step 230, the method includes identifying one or more target images based upon the dissimilarity measurement.

The method 200 can be performed by processing system 100 which can be provided in the form of a stand alone processing system or a distributed processing system.

Figure 3:
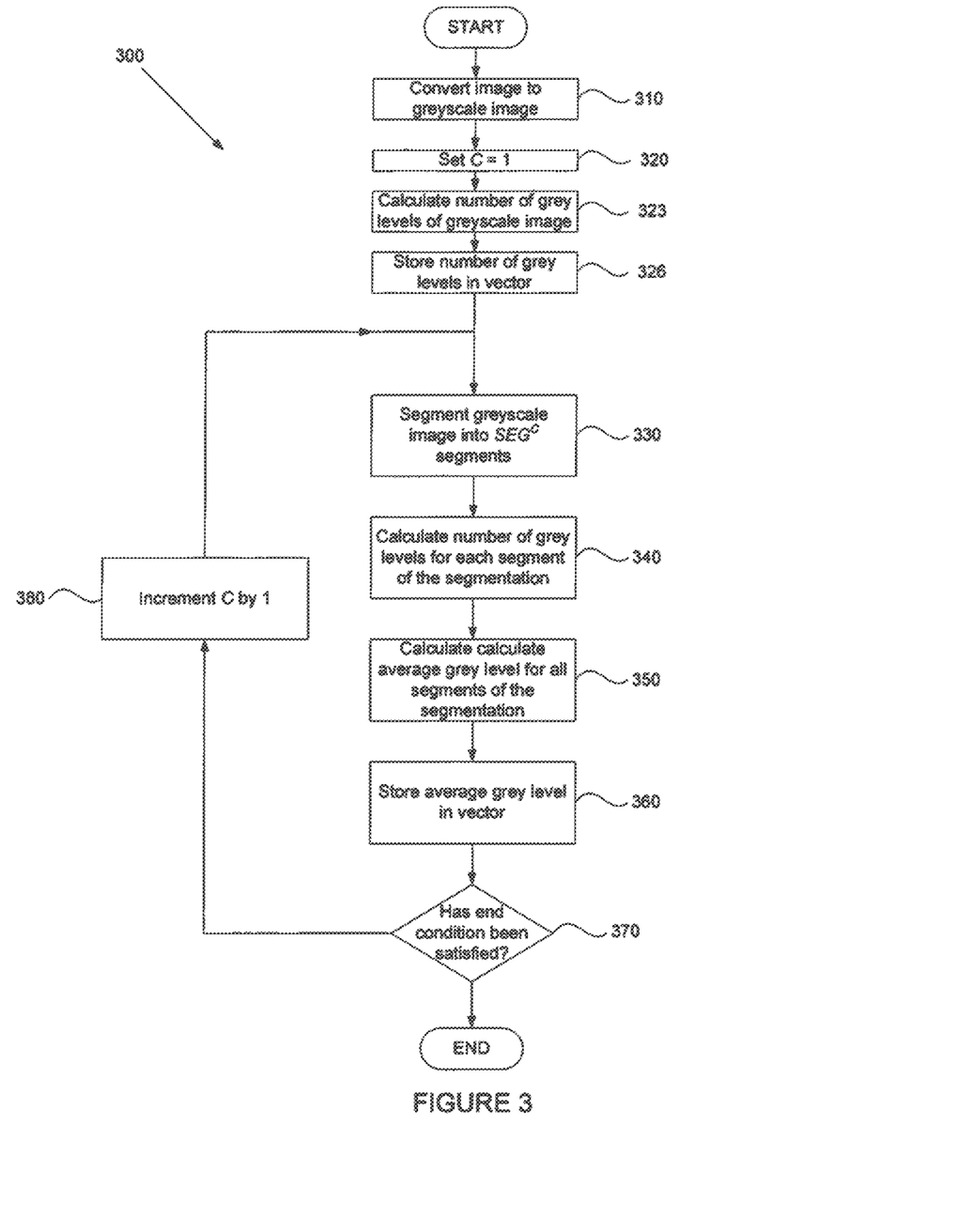
FIG. 3 illustrates a more detailed flow chart representing an example method of determining if a search image includes substantially similar content to a target image.

Referring to FIG. 3 there is shown a flowchart of a method of determining texture data for an image. It will be appreciated that the image which the texture data is being determined may be a query image or a target image.

In particular, at step 310 the method 300 includes the processor of the processing system converting the image to a monochromatic image, such as a greyscale image. At step 320, the method includes the processor of the processing system setting a counter in memory of the processing system to equal one.

At step 323, the method includes the processor of the processing system determining a number of monochromatic levels contained within the monochromatic image. Therefore, in the event that the image has been converted to a greyscale image in step 310, the method includes the processor of the processing system determining the number of monochromatic intensity levels, such as the number of shades of grey, that are contained within the greyscale image.

At step 326 the method 300 includes the processor of the processing system storing in memory of the processing system the number of greyscale levels in a data store. In one form, the number of greyscale levels for the greyscale image is stored in a vector indicative of the texture data for the image at plurality of resolutions. As will be discussed in more detail below, generally an average number of greyscale levels for a number of segments in stored in the texture vector. However, as the image has not been segmented yet in method 300, the number of greyscale levels of the entire image is also the average number of greyscale levels for the entire image, and thus is stored in the texture vector.

At step 330, the method 300 includes the processor of the processing system segmenting the greyscale image into a plurality of segments. In one form, the method includes segmenting the greyscale image into quadrant segments. Upon subsequent iterations, each quadrant segment is again segmented into another four segments. However, it will be appreciated that dividing the image into quadrant segments is not essential and that the image may be divided into two or more portions.

In the example method 300, the image is divided by the processor of the processing system into quadrants. The method includes the processor of the processing system segmenting the greyscale image into $4^C$ segments wherein C is the value of the counter. Upon a first iteration of the method 300, the value of the counter is equal to one, and thus the number of segments is equal to four. By segmenting the image, different texture data is determined for a plurality of segmentations or resolutions which can be subsequently used for image retrieval.

At step 340, the method 300 includes, for each segment, the processor of the processing system calculating a number of different greyscale levels in the greyscale segment. At step 350, the method 300 includes the processor of the processing system determining an average number of greyscale levels, or the number of monochromatic intensity levels, for all segments of the particular segmentation of the image. This can be performed by the processor of the processing system summing the number of greyscale levels for all the segments of the image and dividing the sum by the number of segments for the specific segmentation. The average number of greyscale levels for all segments of the image is the values stored in the texture data for the particular segmentation or resolution.

At step 360, the method 300 includes the processor of the processing system storing the average number of greyscale levels in a data store. In one form, the average number of greyscale levels is stored in a vector. The vector is indicative of the texture data for the image for a plurality of segmentations.

At step 370, the method 300 includes the processor of the processing system determining if an end condition has been satisfied. In one form, this may include comparing the counter to a threshold indicative of the number of segmentations required to generate the texture data for the image. In the event that the end condition has been satisfied, the texture data has been generated for the image which can be used for image retrieval, and thus the method 300 ends. However, in the event that the end condition has not been met (i.e. the required number of segmentations of the image has not been completed), then the method 300 continues to step 380.

At step 380, the method 300 includes the processor of the processing system incrementing the counter by one. The method then returns to step 330, wherein the greyscale image is further segmented by the processor of the processing system into a larger number of segments.

It will be appreciated that at least one iteration of steps 330 to 370 is to be performed in order to create the texture vector indicative of the texture data for the image for a plurality of resolutions (i.e. the image and the image as segmented after at least one segmentation).

Figure 4:
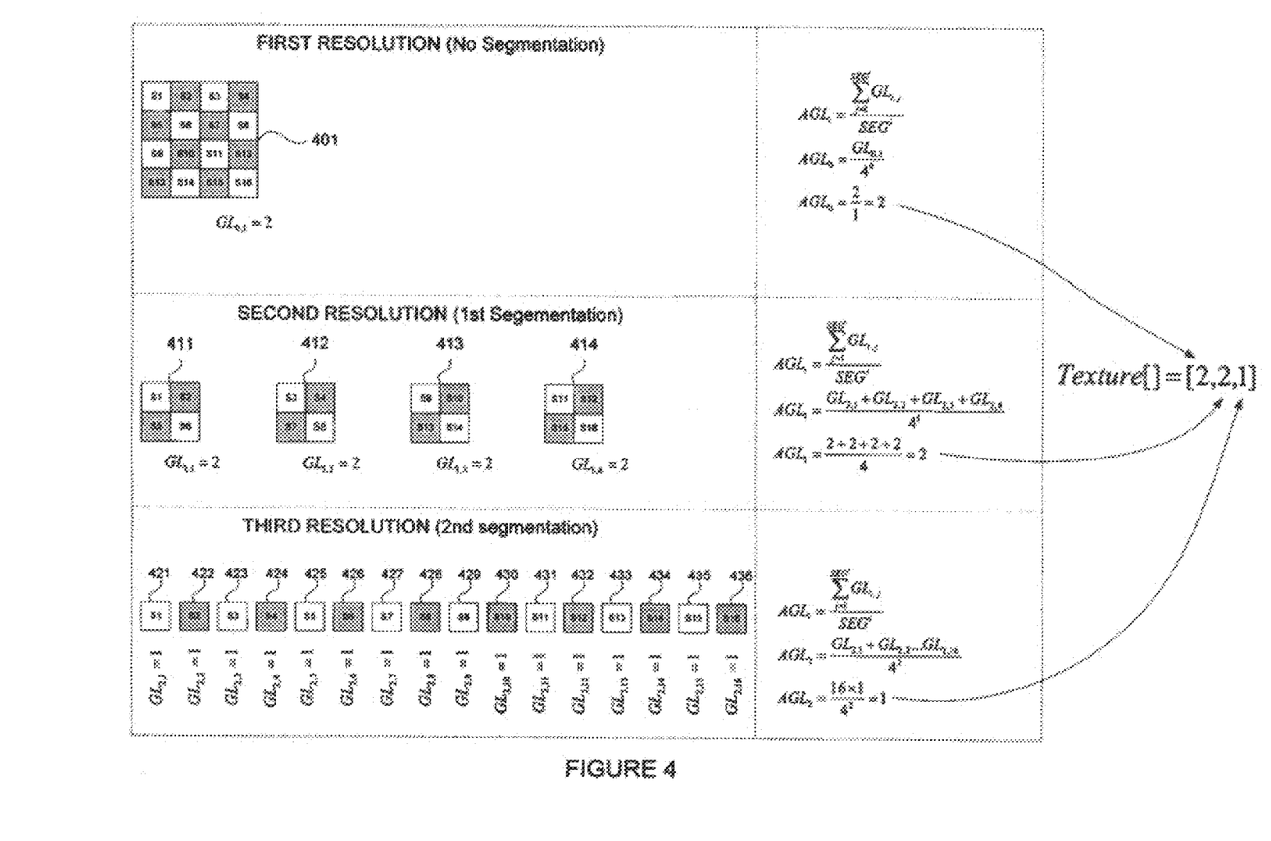
FIG. 4 illustrates a block diagram representing a method of determining texture data for an image.

Referring to FIG. 4, there is shown a block diagram illustrating the segmentation process of method 300 to determine texture data for an image for a plurality of resolutions.

In particular, the image 401 includes a number of portions, wherein each portion of the image has been labelled (S1 through to S16) for clarity purposes only and thus these labels do not form part of the image. Additionally, the image shown in FIG. 4 has already been converted from a colour image to a greyscale image. The segments of the greyscale image are non-overlapping segments as shown in FIG. 4 which illustrates three resolution levels of the image 401. It will be appreciated that at least two resolutions levels of the image may be analysed in order to generate the texture data.

In one form, five resolution levels (i.e. four levels of segmentation) is preferable. However, for higher resolution images, a higher number of segmentations may be performed in order to determine more highly accurate texture data. The variable SEG refers to a segmentation factor which indicates how many times a segment, or image, is divided upon each segmentation. In this example, the segmentation factor, SEG, equals four. As already discussed, whilst dividing segments into four quadrants is shown throughout the examples, it is possible to divide the image into two or more segments.

Continuing to refer to FIG. 4, and specifically the first resolution, the number of grey levels (GL) is determined for the single segment 401. In particular, segment 401 includes a particular shade of grey and white thereby indicating 2 grey levels are provided in the first segment. As only one segment exists for first segmentation, the average grey level (AGL) value for the first segmentation is 2. In FIG. 4, the notation $GL_{x,y}$ refers to the grey level value for the $y^{th}$ segment of the $x^{th}$ segmentation. Similarly, the notation $AGL_i$ refers to the average grey level value for the $i^{th}$ segmentation. It will be appreciated that the $1^{st}$ segment of the $0^{th}$ segmentation is the analysis of the unsegmented image.

Upon determining the number of greyscale levels of the image, the image 401 is divided into four equal segments 411, 412, 413, 414. Again, the grey levels for each segment is determined, wherein the grey level value $GL_{1,1}$ for segment 411 is again 2 since a particular shade of grey and white appears in segment 411. Similarly, the grey level values $GL_{1,2}$, $GL_{1,3}$, and $GL_{1,4}$ for segments 412, 413 and 414 are each equal to 2.

The average grey level value for the second segmentation, $AGL_1$ is determined by summing $GL_{1,1}$, $GL_{1,2}$, $GL_{1,3}$, and $GL_{1,4}$ and dividing the summation by the number of segments. In this instance, $AGL_1$ is equal to 2.

Upon performing the second segmentation, the each segment 411, 412, 413 and 414 is again divided by the segmentation factor, SEG. In this instance, sixteen segments are created which are represented in FIG. 4 by 421 through to 436. Again, for each segment in the third segmentation, the grey level value is calculated. In this instance, each segment, 421, 422, . . . 436, includes a single grey level, that being either a particular shade of grey or white. Therefore, $GL_{2,1}$, $GL_{2,2}$, . . . $GL_{2,16}$ equals one. The average grey level value for the third segmentation, $AGL_2$, equals one due to dividing the summation of the grey level values, that being sixteen, by the number of segments in the segmentation, that being sixteen.

As can be seen from FIG. 4, the average grey level values for each resolution are located in a particular position in a texture vector. In particular, $AGL_0$ is stored in the first position of the texture vector, $AGL_1$ is stored in the second position in the texture vector, and $AGL_2$ is stored in the third position in the texture vector. The texture vector for the image has now been generated and can be used for image retrieval.

Figure 5:
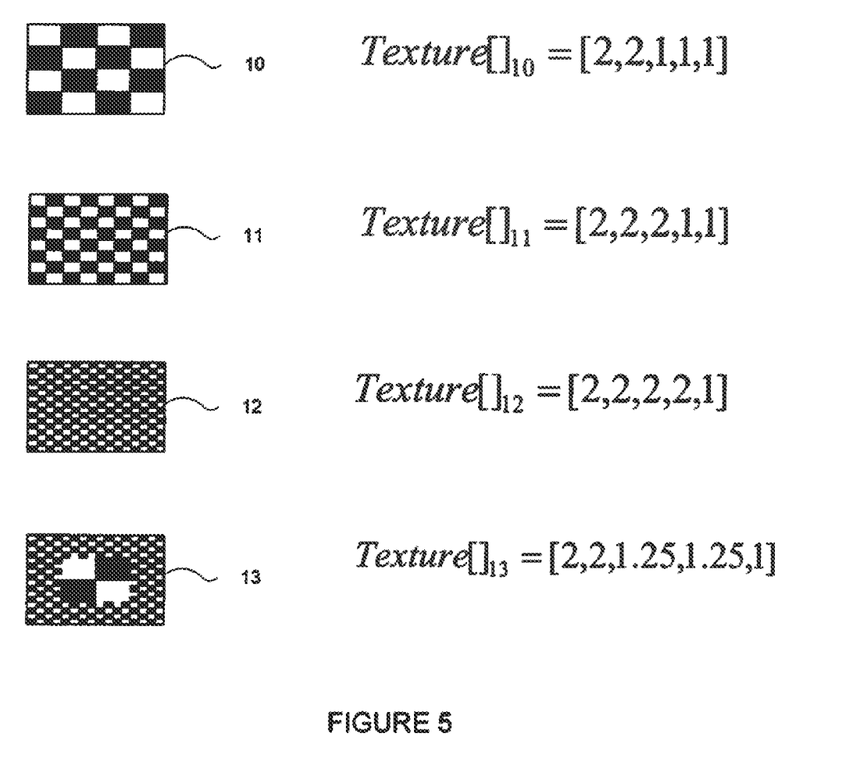
FIG. 5 illustrates sample images with corresponding texture data for distinguishing between the sample images.

Referring to FIG. 5, images 10, 11, 12 and 13, which were referred to in FIG. 1A, are shown in FIG. 5, wherein each image is shown with a corresponding texture vector which is determined using method 300. In particular, it will be appreciated that four levels of segmentation (i.e. 5 resolution levels) have been performed for images 10, 11, 12 and 13 as the corresponding texture vectors each include five values. As can be seen from FIG. 5, the texture vector for each image is unique, thus allowing the images to be distinguished which has previously been a disadvantage using known techniques such as colour histograms.

Figure 6:
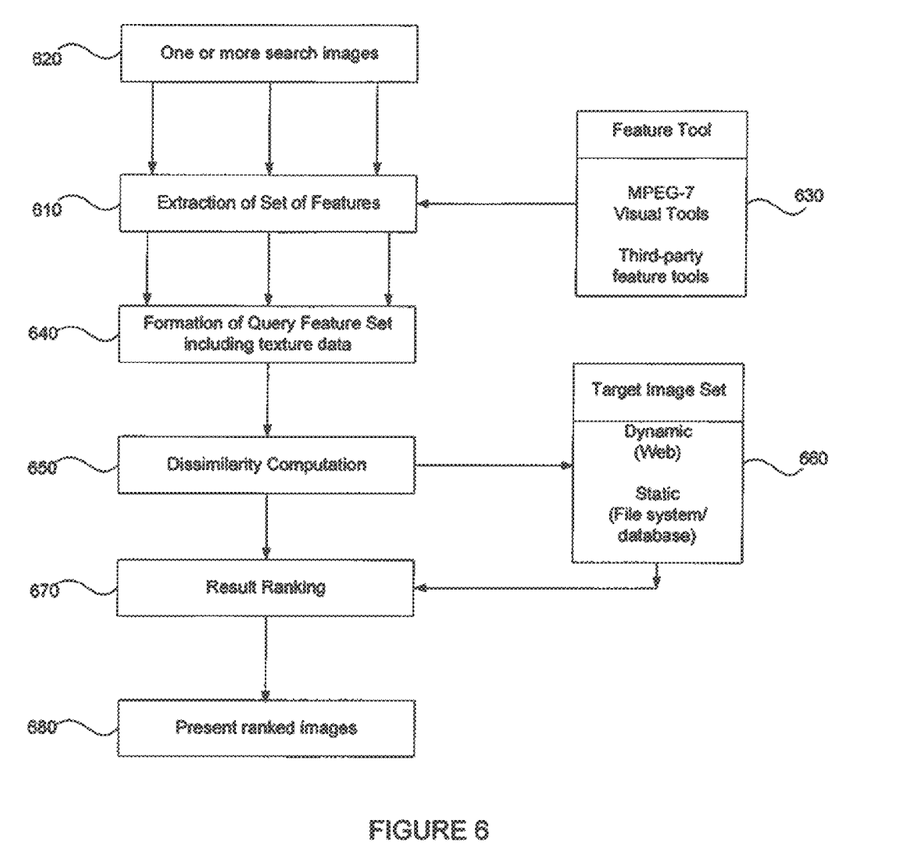
FIG. 6 illustrates a more detailed flowchart representing an example method of image retrieval.

Referring to FIG. 6 there is shown an example method of image retrieval. In particular, the method 600 commences with a user selecting one or more selected images to define the query image set 610. The feature extraction process 620 extracts a set of features from the query image set, for example using feature tool 630 which may be any of a range of third party image feature extraction tools, typically in the form of software applications.

A query feature set, including texture data, is then determined or otherwise constructed at step 640 from the extracted set of features. The query feature set can be conceptually thought of as an idealized image constructed to be representative of the one or more selected images forming the query image set. A dissimilarity measurement/computation is applied at step 650 to one or more target images in the target image set 660 to identify/extract one or more selected images 680 that are deemed sufficiently similar or close to the set of features forming the query feature set. The one or more selected images 680 can be ranked at step 670 and displayed to the user.

In relation to performing the dissimilarity computation for the texture data, the texture data for the search image and a target image can be compared by calculating a distance or dissimilarity texture value. In one form, a number of weighting factors can be used to weight the average grey level values for each of the search image and the target image. The weighting factors can be provided in the form of a texture weighting vector, w[ ]. In one form, equation (1) below provides a distance or dissimilarity formula for determining a dissimilarity or distance value:

$$dist = \sum_{i=1}^{5} |v1[i] - v2[i]| * w[i] \quad (1)$$

where:
v1 is the texture vector for the search image
v2 is the texture vector for the target image
w is the texture weighting vector
dist is the texture dissimilarity value As can be seen from equation (1), the higher the texture dissimilarity value, the more dissimilar the target image is to the search image in regard to texture.

Referring back to FIG. 6, the feature extraction process 620 of FIG. 6 is used to base the query feature set on a low level structural description of the query image set. An image object I can be described by a set of features $X = \{x_n = 1, 2, \ldots, N\}$. Each feature is represented by a $k_n$-dimensional vector $x_n = \{x_1, x_2, \ldots, x_{kn}\}$ where $x_{n,j} \in |0, b_{n,j}| \subset R$, and R is a real number. The $n^{th}$ feature extraction is a mapping from image I to the feature vector as:

$$x_n = f_n(I) \quad (2)$$

A variety of visual features, such as colour, texture, objects, etc, as well as texture as has been explained above, can be used. Third party visual feature extraction tools can be used as part of the method or system to extract features.

For example, the popular MPEG-7 visual tool is suitable. The MPEG-7 Color Layout Descriptor (CLD) is a very compact and resolution-invariant representation of color which is suitable for high-speed image retrieval. MPEG-7 uses only 12 coefficients of 8×8 DCT to describe the content from three sets (six for luminance and three for each chrominance), as expressed as follows:

$$x_{CLD} = (Y_1, \ldots, Y_6, Cb_1, Cb_2, Cb_3, Cr_1, Cr_2, Cr_3) \quad (3)$$

The MPEG-7 Edge Histogram Descriptor (EHD) uses 80 histogram bins to describe the content from 16 sub-images, as expressed as follows:

$$x_{EHD} = (h_1, h_2, \ldots, h_{80}) \quad (4)$$

While the MPEG-7 set of tools is useful, there is no limitation to this set of feature extraction tools. There are a range of feature extraction tools that can be used to characterize images according to such features as colour, hue, luminance, structure, texture, location, objects, etc.

The query feature set is implied/determinable by the example images selected by the user (i.e. the one or more selected images forming the query image set). A query feature set formation module generates a 'virtual query image' as a query feature set that is derived from the user selected image(s). The query feature set is comprised of query features, typically being vectors.

The fusion of features forming a particular image may be represented by:

$$x^i = (x_1^i \oplus x_2^i \oplus \ldots \oplus x_n^i) \quad (5)$$

For a query image set the fusion of features is:

$$X = (x^1 \oplus x^2 \oplus \ldots \oplus x^m) \quad (6)$$

The query feature set formation implies an idealized query image which is constructed by weighting each query feature in the query feature set used in the set of features extraction step. The weight applied to the $i^{th}$ feature x, is:

$$w_i = f_w^1(x_1^1, x_2^1, \ldots, x_n^1; x_1^2, x_2^2, \ldots, x_n^2; x_1^m, x_2^m, \ldots, x_n^m) \quad (7)$$

The idealized/virtual query image $I_Q$ constructed from the query image set Q can be considered to be the weighted sum of query features $x_i$ in the query feature set:

$$I_Q = \sum_i w_i x_i \quad (8)$$

In regard to the dissimilarity computation, the feature metric space $X_n$ is a bounded closed convex subset of the $k_n$ dimensional vector space $R^{kn}$. Therefore, an average, or interval, of feature vectors is a feature vector in the feature set. This is the base for query point movement and query prototype algorithms. However, an average feature vector may not be a good representative of other feature vectors. For instance, the colour grey may not be a good representative of colours white and black.

In the case of a multi-image query image set, the 'distance' or 'dissimilarity' is measured or calculated between the query image set $Q = \{I_{q1}, I_{q2}, \ldots, I_{qQ}\}$ and a target image $I_j \epsilon T$ as:

$$D(Q, I_j) = D(\{I_{q1}, I_{q2}, \ldots, I_{qQ}\}, I_j) \quad (9)$$

In one example, a distance or dissimilarity function expressed as a weighted summation of individual feature distances can be used as follows:

$$D(I_q, I_m) = \sum_{i=1}^{N} w_i \cdot d_i(x_{qi}, x_{ni}) \quad (10)$$

Equation (10) provides a measurement which is the weighted summation of a distance or dissimilarity metric d between query feature $x_q$ and queried target feature $x_n$ of a target image from the target image set.

The weights $w_i$ are updated according to the query image set using equation (7). For instance, the user may be seeking to find images of bright coloured cars. Conventional text based searches cannot assist since the query "car" will retrieve all cars of any colour and a search on "bright cars" will only retrieve images which have been described with these keywords, which is unlikely. However, an initial text search on cars will retrieve a range of cars of various types and colours. When the user chooses one or more selected images that are bright the feature extraction and query formation provides greater weight to the luminance feature than, say, colour or texture. On the other hand if the user is looking for blue cars, the one or more selected images chosen by the user would be only blue cars. The query formation would then give greater weight to the feature colour and to the hue of blue rather than to features for luminance or texture.

In each case, the dissimilarity computation is determining a similarity value or measurement that is based on the features of the query feature set (as obtained from the query image set selected by the user) without the user being required to define the particular set of features being sought in the target image set, it will be appreciated that this is an advantageous image searching approach.

In regard to ranking the images results, the image(s) extracted from the target image set using the query image set can be conveniently displayed according to a relevancy ranking. There are several ways to rank the one or more identified images that are output or displayed. One possible and convenient way is to use the dissimilarity measurement described above. That is, the least dissimilar (most similar) identified images are displayed first followed by more dissimilar images up to some number of images or dissimilarity limit. Typically, for example, the twenty least dissimilar identified images might be displayed.

The distance between the images of the query image set and a target image in the database is defined as follows, as is usually defined in a metric space:

$$d(Q, I_j) = \min_{I_q \leq Q} \{d(X_q, X_j)\} \quad (11)$$

The measure of d in equation (11) has the advantage that the top ranked identified images should be similar to one of the example images from the query image set, which is highly expected in an image retrieval system, while in the case of a previously known prototype queries, the top ranked images should be similar to an image of average features, which is not very similar to any of the user selected example images. The present method should thus provide a better or improved searching experience to the user in most applications.

An example software application implementation of the method can use Java Servlet and JavaServer pages technologies supported by an Apache Tomcat® web application server. The application searches for target images based on image content on the Internet, for example via keyword based commercial image search services like Google® or Yahoo®. The application may be accessed using any web browsers, such as Internet Explorer or Mozilla/Firefox, and uses a process to search images from the Internet. In a first step, a keyword based search is used to retrieve images from the Internet via a text based image search service to form an initial image set.

In a second step, a user selects one or more images from the initial search set to form the query image set. Selected images provide examples that the user intends to search on, this can be achieved in one embodiment by the user clicking image checkboxes presented to the user from the keyword based search results. In a third step, the user conducts a search of all target images in one or more image databases using a query feature set constructed from the query image set. Alternatively, it should be appreciated that the one or more selected images forming the query image set can come from a variety of other image sources, for example a local storage device, web browser cache, software application, document, etc.

According to another example, the method can be integrated into desktop file managers such as Windows Explorer® or Mac OS X Finder®, both of which currently have the capability to browse image files and sort them according to image filenames and other file attributes such as size, file type etc. A typical folder of images is available to a user as a list of thumbnail images. The user can select a number of thumbnail images for constructing the query image set by highlighting or otherwise selecting the images that are closest to a desired image. The user then runs the image retrieval program, which can be conveniently implemented as a web browser plug-in application.

Preferably, the applications hereinbefore described need not totally replace a user's existing search methodology. Rather, the system/method complements an existing search methodology by providing an image refinement or matching capability. This means that there is no major revamp of a user's methodology, especially in a user interface. By provision as a complementary technology, enhancement of a user's searching experience is sought.

A user's existing image retrieval application can be used to specify image requirements. Traditionally, users are comfortable with providing a text description for an initial image search. Once a textual description of the desired image is entered by the user, the user's existing search methodology can be executed to provide an initial list of images that best match the textual description. This is considered an original or initial result set.

These original result set images are displayed using a user's existing result display interface. Modifications to the existing results display interface can include the ability for the user to select one or more images as the reference images for refining their image search, i.e. using images to find matching images. Preferably, there is provided functionality in the results display interface (e.g. application GUI) for the user to specify that he/she wants to refine the image search, i.e. inclusion of a 'Refine Search' option. Potentially, this could be an additional 'Refine Search' button on the results display interface.

When a form of 'Refine Search' option is selected, the user's search methodology invokes the image retrieval system to handle the request. The selected images are used as the one or more selected images defining a query image set for performing similarity matches. If required, the search can be configured to search through a complete database to define a new result set. In relation to the texture of the image, the system finds images that have at least some similarity in texture as described above.

The above embodiments may take the form of an entirely hardware embodiment, an entirely software embodiment, firmware, or an embodiment combining software and hardware aspects.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A method of image retrieval, wherein the method includes, in a processing system:
   determining a query feature set for a search image, wherein the query feature set includes texture data indicative of a texture of the search image for a plurality of resolutions of the search image, wherein texture data of the search image includes a texture vector of the search image which is determined by performing the following steps:
   a) converting the search image to a monochromatic image;
   b) determining and storing in the texture vector a number of monochromatic levels of the monochromatic image;
   c) segmenting the monochromatic image to generate a plurality of segments;
   d) determining an average number of monochromatic levels for the plurality of segments of the respective segmentation;
   e) storing the average number of monochromatic levels for the respective segmentation in the texture vector; and
   f) if a segmentation condition has not been satisfied, segmenting each segment and repeating steps d) to f);
   determining a dissimilarity measurement between at least one query feature of the query feature set and at least one target feature of a target image set for one or more target images, wherein the dissimilarity measurement is determined at least partially based upon the dissimilarity between the texture data of the search image and one or more target images for at least some of the plurality of resolutions of the target image; and
   identifying one or more target images based upon the dissimilarity measurement.

2. The method according to claim 1, wherein the segmentation condition includes determining if a threshold number of segmentations have been performed.

3. The method according to claim 1, wherein determining the average number of monochromatic levels for each segmentation includes:
   determining a number of monochromatic levels for each segment of the respective segmentation;
   summing the number of monochromatic levels for the segments of the respective segmentation to generate a total number of monochromatic levels; and
   dividing the total number of monochromatic levels by the number of segments to obtain the average number of monochromatic levels for the respective segmentation.

4. The method according to claim 1, wherein converting the respective image to the monochromatic image includes converting the respective image to a greyscale image.

5. The method according to claim 1, wherein the method includes querying a data store in data communication with the processing system, wherein the data store includes texture data for the one or more target images.

6. A hardware implemented processing system for image retrieval configured to:
   determine a query feature set for a search image, wherein the query feature set includes texture data indicative of a texture of the search image for a plurality of resolutions of the search image, wherein texture data of the search image includes a texture vector of the search image which is determined by the processing system by performing the following steps:
   a) converting the search image to a monochromatic image;
   b) determining and storing in the texture vector a number of monochromatic levels of the monochromatic image;
   c) segmenting the monochromatic image to generate a plurality of segments;
   d) determining an average number of monochromatic levels for the plurality of segments of the respective segmentation;

e) storing the average number of monochromatic levels for the respective segmentation in the texture vector; and f) if a segmentation condition has not been satisfied, segmenting each segment and repeating steps d) to f);

determine a dissimilarity measurement between at least one query feature of the query feature set and at least one target feature of a target image set for one or more target images, wherein the dissimilarity measurement is determined at least partially based upon the dissimilarity between the texture data of the search image and texture data of one or more target images for at least some of the plurality of resolutions of the target image; and identify one or more target images based upon the dissimilarity measurement.

7. The processing system according to claim 6, wherein the processing system is configured to determine if a segmentation condition has been satisfied by determining if a threshold number of segmentations have been performed.

8. The processing system according to claim 6, wherein the processing system is configured to determine the average number of monochromatic levels for each segmentation by:

determining a number of monochromatic levels for each segment of the respective segmentation;

summing the number of monochromatic levels for the segments of the respective segmentation to generate a total number of monochromatic levels; and dividing the total number of monochromatic levels by the number of segments to obtain the average number of monochromatic levels for the respective segmentation.

9. The processing system according to claim 6, wherein the processing system is configured to convert the respective image to a greyscale image.

10. The processing system according to claim 6, wherein the processing system is configured to query a data store in data communication with the processing system, wherein the data store stores texture data for the one or more target images.

11. A computer readable medium having data indicative of a computer program, the computer readable medium being non-transitory, wherein the computer program configures a processing system to:

determine a query feature set for a search image, wherein the query feature set includes texture data indicative of a texture of the search image for a plurality of resolutions of the search image, wherein texture data of the search image includes a texture vector of the search image which is determined by the processing system by performing the following steps:

a) converting the search image to a monochromatic image;

b) determining and storing in the texture vector a number of monochromatic levels of the monochromatic image;

c) segmenting the monochromatic image to generate a plurality of segments;

d) determining an average number of monochromatic levels for the plurality of segments of the respective segmentation;

e) storing the average number of monochromatic levels for the respective segmentation in the texture vector; and f) if a segmentation condition has not been satisfied, segmenting each segment and repeating steps d) to f);

determine a dissimilarity measurement between at least one query feature of the query feature set and at least one target feature of a target image set for one or more target images, wherein the dissimilarity measurement is determined at least partially based upon the dissimilarity between the texture data of the search image and texture data of one or more target images for at least some of the plurality of resolutions of the target image; and identify one or more target images based upon the dissimilarity measurement.

12. The computer readable medium according to claim 11, wherein the segmentation condition includes determining if a threshold number of segmentations have been performed.

13. The computer readable medium according to claim 11, wherein the computer program configures the processing system to determine the average number of monochromatic levels for each segmentation by:

determining a number of monochromatic levels for each segment of the respective segmentation;

summing the number of monochromatic levels for the segments of the respective segmentation to generate a total number of monochromatic levels; and dividing the total number of monochromatic levels by the number of segments to obtain the average number of monochromatic levels for the respective segmentation.

14. The computer readable medium according to claim 11, wherein the computer program configures the processing system to convert the respective image to a greyscale image.

15. The computer readable medium according to claim 11, wherein computer program configures the processing system to query a data store in data communication with the processing system, wherein the data store stores texture data for the one or more target images.

* * * * *